Feb. 23, 1960   G. A. HEMPEL   2,925,990
SPOUTED GATE VALVE
Filed June 13, 1955
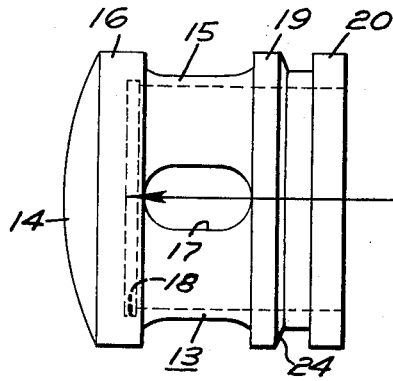
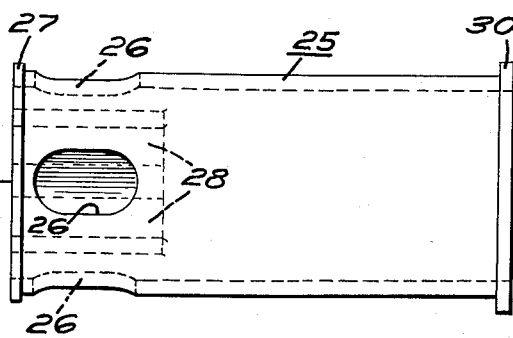
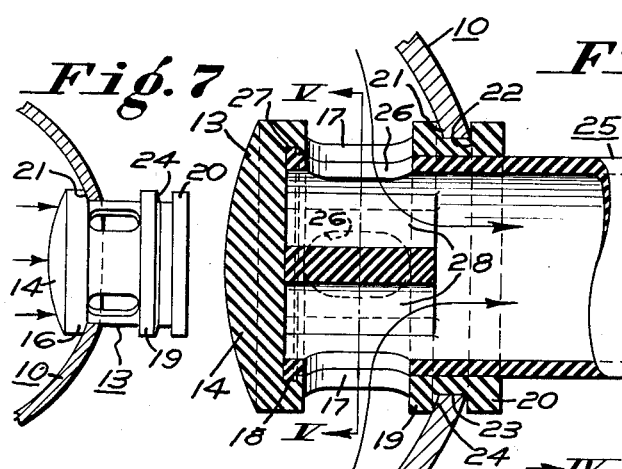
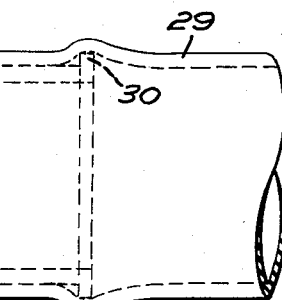
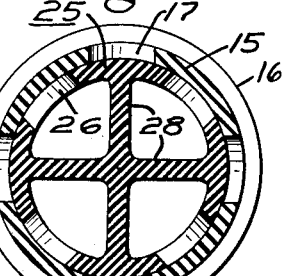
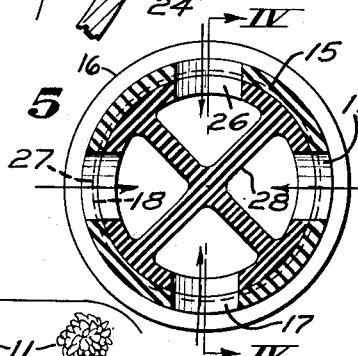
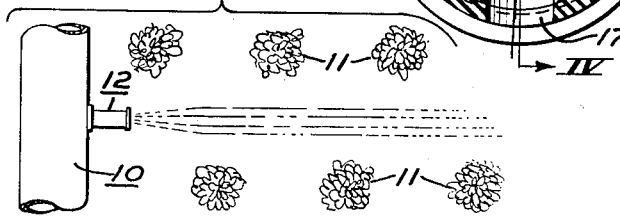
INVENTOR:
GUSTAV A. HEMPEL
BY
Green, McCallister & Miller
his Attorneys.

ns/a United States Patent Office 2,925,990
Patented Feb. 23, 1960

2,925,990

SPOUTED GATE VALVE

Gustav A. Hempel, Pittsburgh, Pa., assignor to McDowell Manufacturing Company, Pittsburgh, Pa., a corporation of Pennsylvania Application June 13, 1955, Serial No. 514,854

6 Claims. (Cl. 251—145)

This invention relates to a gate valve and particularly to one in which the gate may act also as a spout and as a fine adjustable control for supplying liquids from a housing or pipe member such as may be used in irrigating crop rows.

In irrigating crop rows, a length of pipe is laid transversely of a series of longitudinally-extending row plantings which have a suitable transverse spacing with respect to each other. The tubing or pipe line is provided with fluid feed or discharge openings, usually of about 40 inch spacing, in alignment with the spacing between the crop rows to supply irrigating water therealong. Means is provided, such as a valve unit, for controlling and shutting off fluid flow from each of the discharge openings that are usually horizontally positioned in the side wall of the pipe line. In this manner, the amount of water supplied may be proportioned to actual requirements from the standpoint of the nature of the crop, the depth of its roots, and the like, and from the standpoint of the type and intensity of irrigating action desired.

Valve units heretofore used for this purpose have not been entirely satisfactory. In the first place, difficulty has been encountered in inserting and mounting the valve units through openings in the side wall of a tubing housing member or pipe section. In the second place, valve units heretofore used have been of a type such that they are subject to damage when the pipe section is transported or removed from one place to another. In the third place, difficulty has been encountered in fully shutting-off the valves and in operating them due to silt or dirt jamming.

In my Patent No. 2,693,203 which issued November 2, 1954, I have described and claimed a gated valve that entirely obviates the above difficulties. The gated valve of this patent may be stationed within a wall opening of a fluid carrying member between positions of minimum and maximum insertions. In the position of minimum insertion, the valve is shut. As the valve body is inserted farther into the fluid carrying member, a passageway along a side of the body enters the housing member and conducts fluid therefrom through the passageway and out the valve. Still further insertion of the valve increases the effective flow area of the passageway and therefore likewise increases the rate of fluid flow therethrough until substantially the position of maximum insertion is reached.

Although this valve is satisfactory for the purposes indicated, the fluid seal between the edges of the wall opening in the fluid-carrying housing member and the exterior of the valve intermediate the positions of minimum and maximum insertion has been found to be not as tight as the seal between such wall edges and the valve at the extreme positions mentioned. Further, since the actual insertion and positioning of the valve body with respect to the wall opening is by hand, the control of the effective flow area of the passageway and the resultant control of the rate of fluid flow is necessarily relatively coarse. Additionally, the gated valve of my indicated patent is not readily connected to a hose exteriorly of the housing member as when it is desired to conduct fluid from the housing member for some distance prior to its distribution at a point of use. Still further, the valve of this patent has substantially only one shut-off position.

The gated valve of my present invention similarly overcomes the difficulties met with the valves in use prior to my Patent No. 2,693,203 and, in addition, provides further advantages. My instant valve provides a tight fluid seal at all times with the wall opening in the fluid carrying member and is capable of a much finer control on the rate of fluid flow. Moreover, a portion of the gate is readily adapted for detachable connection to another conductor, such as a flexible hose, when it is desired to conduct the fluid for some distance away from the housing member. In addition, the gate of the valve may actually be removed when desired and the valve body shifted to a second shut-off position with respect to the fluid-carrying member.

In my instant gated valve, the valve body need not be moved longitudinally with respect to an open wall portion of a fluid-carrying member to adjust an effective flow area. Instead, such body is fixed with respect to the fluid-carrying member, and a tubular member is mounted within the valve body for relative movement therewith to cover and uncover a side passageway or opening in the body. The tubular member also acts as a spout and may, if desired, be entirely removed from the valve. In this case, the valve body is pulled outwardly to a second shut-off position.

In my copending applications, Serial Numbers 514,853 and 514,855, filed June 13, 1955, I have described and claimed two other forms of my improved gated valve. The instant valve differs from those of the copending applications in that the gate or sleeve fits within a closed inner end of the valve body and has only relative rotary movement therewith. For example, in one form, the instant valve includes a cup-shaped body having an opening or passageway in one side and a groove along an inside wall of the body. Flexible means on the body between the side opening and the open end of the cup-shaped body engages a periphery of an open wall portion of a fluid-carrying housing member to seal off fluid flow between such member and the body. A sleeve carried within the cup-shaped body has an opening aligned transversely of the body with its side wall opening. A projection on the sleeve engages the groove in the body and effects relative rotation between the sleeve and the body to move the openings into and out of registry. In the preferred form, the sleeve extends outwardly beyond the open outer end of the cup-shaped body to act also as a spout. When for convenience or safety it is desired to remove the spout or sleeve, the latter may be readily stripped from the cup-shaped body and the body then shifted to a second shut-off position. To reach this position, the body is pulled outwardly from the housing member, and additional flexible means adjacent the closed end of the cup-shaped body engages a periphery of the open wall portion as before to seal off fluid flow between the body and the open wall portion.

The accompanying drawing illustrates a presently preferred embodiment wherein:

Figure 1 is a diagrammatic plan view of a crop row system illustrating how a valve of my invention may be employed;

Figures 2 and 3 are side elevations of the cup-shaped body and the gate or sleeve, respectively, of the valve of Figure 1;

Figure 4 is a center, longitudinal section of the parts of Figures 2 and 3 when assembled and rotated to a fully opened position;

Figure 5 is a section of Figure 4 on the line V—V;

Figure 6 is a section similar to Figure 5 illustrating the parts in a fully closed position; and Figure 7 is a side elevation of the valve showing a second shut-off position with the gate or sleeve removed.

Referring to the drawing, my valve may be used with a fluid-carrying housing member shown in Figure 1 as a pipe 10. The pipe lies transversely of crop rows 11 with the instant valve, generally shown at 12, extending preferably parallel to and between the rows to supply irrigating water.

The embodiment illustrated includes a cup-shaped body 13 formed from a relatively soft resilient material such as natural or synthetic rubber. The body 13 has a closed-off inner end 14 and a longitudinally extending side wall 15 terminating in an open outer end. The end 14 is preferably dome-shaped, as hereinafter described, and has a flexible, radially extending sealing rib 16. The wall 15 has radial openings or passageways 17 adjacent its inner end and a groove 18 along an inside wall of the body between the end 14 and the openings 17 which extends substantially transversely thereof. A pair of spaced-apart resilient sealing rims 19 and 20 extend radially outwardly from the cup-shaped body to engage inner and outer seating surfaces 21 and 22 about wall edges 23 of an open wall portion in the pipe 10 and thereby seal off fluid flow between the wall edges and the cup-shaped body 13. As illustrated in Figure 4, the rims 19 and 20 preferably grip the peripheral seating surfaces 21 and 22 with respect to the cup-shaped body 13 at a point between the passageways 17 and the outer open end of that body. Preferably, the inner sealing rim 19 has a tapered side 24 which conforms with the configuration of the inner seating surface of the pipe 10.

A tubular member or sleeve 25 which functions, inter alia, as the gate of the valve makes a relatively snug fit within the body 13 and has opposed radial openings or passageways 26 which are alignable transversely of the body 13 with its passageways 17 when the sleeve 25 is inserted in the body as shown in Figure 4. An external circumferential flange 27 on the sleeve fits within the groove 18. Preferably, the sleeve 25 has cross ribs 28 which extend radially across the inside of the sleeve to connect the sleeve portions between the openings 17 and thereby reinforce that end.

The sleeve may be metal, plastic, rubber, and the like. Preferably, it is a denser material than that composing the cup-shaped body 13. For example, when the sleeve 25 is rubber, it may have a durometer reading as high as 100 or higher, while the cup-shaped body 13 may have a durometer reading approximating 60 to 70.

In practice, the cup-shaped body, preferably while free of the sleeve 25, is manually collapsed, inserted at an angle through the wall opening defined by the edges 23 with the closed end 14 leading, and then squeezed and flexed until the rims 19 and 20 straddle the edges 23 as shown in Figure 4. The sleeve 25 is then similarly treated with respect to the open end of the cup-shaped body 13 until the flange 27 reaches the groove 18. Preferably, this union between the flange and the groove is in the nature of a snap fit. The sleeve is then turned relatively to the body 13, if necessary, to position the parts as shown in Figure 6 and close the valve. When pressure is admitted to the pipe 10, the dome-shaped area of the closed end 14 provides a fluid pressure area that is greater than the transverse area of that end in a plane taken normal to the longitudinal axis of the body 13. The dome-shaped area is sensitive to fluid pressure because of its resiliency and accordingly moves the inner sealing rim 19 into a fluid-tight seating engagement with the inner seating surface 21. In this manner, the dome-shaped outer side of end 14 having a larger pressure area than the inside of end 14, forces the rim 19 tightly against the inside seating surface 21 of pipe 10 to provide a fluid seal between the body 13 and the pipe 10 in response to fluid pressure within the pipe. The tapered side 24 of rim 19, shaped to conform with the configuration of the inner seating surface of pipe 10, aids in this seal. As previously pointed out, the tubular sleeve 25 is made of a more rigid material than flexible rim 19, and therefore the rim 19 cannot flow radially-inwardly because of the rigidity of sleeve 25, but is held in fluid-tight engagement with the outer surface of sleeve 25. However, since the action of fluid pressure on the dome-shaped surface of end 14 places the non-compressible rubber rim 19 under pressure against seating surface 21, the rim can flow in only one direction, and that is radially-outwardly against the radially-inward fluid pressure forces acting on the outer surface of rim 19. Also, as is apparent from Figure 4, the fluid pressure exerted on the large inside pressure area of the sleeve 25 will counteract the fluid pressure exerted on the small outside area of rim 19 and will, therefore, also aid in sealing-off the open portion of the pipe 10, by tending to expand sleeve 25 radially-outwardly, when passageways 17 and 26 are aligned.

To open the valve, it is necessary only to rotate the sleeve 25 until its passageways 26 at least partially register with the passageways 17. Because of the relative rotary movement between the sleeve 25 and the body 13, a very fine degree of control is possible on the effective flow area formed by the openings or passageways 17 and 26 as they move into registry. The sleeve 25 in acting as a spout prevents the water from running back along the spout and can be readily gripped to control the flow without wetting the user. To remove the valve from the pipe 10, the parts may be withdrawn in an order reversed to their assembly.

When it is desired to carry water issuing from the valve 12 a distance from the pipe 10, such as to a trench rather than to discharge it immediately adjacent the pipe, a flexible hose 29 leading to a desired point of use is readily attached to the sleeve 25. Accordingly, the sleeve now acts as a spout in addition to functioning as the gate of the valve. An outwardly projecting flange 30 on the sleeve grips the hose 29 upon its attachment.

It sometimes happens that it is desired to close the valve and yet remove the sleeve 25 to avoid damage thereto during periods of non-use. For example, the sleeve may become plugged from dirt, cut from adjacent stones, and, particularly if made of metal, bent from inadvertent turning of the pipe 10, or upon moving the pipe from place to place. Even though the sleeve 25 acts as the gate of the valve, removal of this sleeve and closure of the valve is still possible with the instant structure. In such a case, the cup-shaped body 13 is moved outwardly until the resilient sealing rib 16 abuts the inner seating surface 21 as shown in Figure 7. The action of pressure against the dome-shaped end 14 aids this pressure seal in the same manner that it aids the seal of the inner sealing rim 19. The sleeve 25 may be readily removed or stripped from the cup-shaped body 13, and when the passageways 17 are effectively stationed on the outside of the pipe 10, there is no fluid flow through the body 13, see Figure 7.

While the foregoing disclosure describes a presently preferred embodiment, it is understood that the invention may be practiced in other forms within the scope of the following claims.

I claim:

1. A gated valve to be inserted into operative engagement with wall edges of an open wall portion of a fluid-carrying housing member including a cup-shaped body made of resilient material and having an extending side wall closed at one end and open at the other, said closed-off end being inwardly placed with respect to the wall edges, said side wall having an open portion to admit fluid from the housing member therethrough and a groove portion along an inside wall of said body extending substantially transversely thereof, a flexible sealing rim integral with said body between the side wall open portion and the open end thereof for insertion past the wall edges into the housing member to seat against an inner surface of the open wall portion, a sleeve carried for relative rotation within the cup-shaped body and having an open portion aligned transversely of said body with the side wall open portion, wherein the open portions may be moved into and out of registry by relative rotation therebetween, and a projection on said sleeve to engage the groove portion and enable relative rotation between said body and said sleeve while maintaining said body and said sleeve in stationary axial alignment.

2. A gated valve to be inserted into operative engagement with wall edges of an open wall portion of a fluid-carrying housing member including a cup-shaped body having an extending side wall closed off at one end and open at the other, said closed-off end being inwardly placed with respect to the wall edges, said side wall having an open portion to admit fluid from the housing member therethrough and a groove portion along an inside wall of said body extending substantially transversely thereof, a flexible sealing rim about said body between the side wall open portion and the open end thereof for insertion past the wall edges into the housing member to seat against an inner surface of the open wall portion, a sleeve carried for relative rotation within the cup-shaped body and having an open portion aligned transversely of said body with the side wall open portion, whereby the open portions may be rotated into and out of registry, a projection on said sleeve to engage said groove portion and enable relative rotation between said body and said sleeve while maintaining said body and said sleeve in stationary axial alignment, said flexible sealing rim being distorted into position behind the inner seating surface about the open wall portion and having a tapered side to conform with the configuration of the inner seating surface, and said closed-off end of the cup-shaped body having a resilient sealing rim to engage said seating surface and seal-off fluid flow between the open wall portion and said body when the flexible sealing rim is moved outwardly past the open wall portion and said sleeve is removed.

3. A gated valve to be inserted into operative engagement with wall edges of an open wall portion of a fluid-carrying housing member including a cup-shaped body having an extending side wall closed-off at one end and open at the other, said closed-off end being inwardly placed with respect to the wall edges, said side wall having an open portion to admit fluid from the housing member therethrough and a groove portion along an inside wall of said body extending substantially transversely thereof, a flexible sealing rim about said body between the side wall open portion and the open end thereof for insertion past the wall edges into the housing member to seat against an inner surface of the open wall portion, a sleeve carried for relative rotation within the cup-shaped body and having an open portion aligned transversely of said body with the side wall open portion, whereby the open portions may be rotated into and out of registry, a projection on said sleeve to engage said groove portion and enable relative rotation between said body and said sleeve while maintaining said body and said sleeve in stationary axial alignment, said closed-off end of the cup-shaped body having a resilient sealing rim to engage said inner seating surface and seal-off fluid flow between the open wall portion and said body when the flexible sealing rim is moved outwardly past the open wall portion.

4. A gated valve to be inserted into operative engagement with wall edges of an open wall portion of a fluid-carrying housing including a cup-shaped body having an extending side wall closed-off at one end and open at the other, said closed-off end being inwardly placed with respect to the wall edges, said side wall having an open portion to admit fluid from the housing member therethrough and a groove portion along an inside wall of said body extending substantially transversely thereof, a flexible cylindrical sealing rim about said body between the side wall open portion and the open end thereof for insertion past the wall edges into the housing member to seat against an inner surface of the open wall portion, a sleeve carried for relative rotation within the cup-shaped body and having an open portion aligned transversely of said bdoy with the side wall open portion, whereby the open portions may be rotated into and out of registry, a projection on said sleeve to engage said groove portion and enable relative rotation between said body and said sleeve while maintaining said body and said sleeve in stationary axial alignment, said cup-shaped body being made of a flexible resilient material, said closed-off end being dome-shaped and distortable under the fluid pressure within the housing member to move the flexible sealing rim into a fluid-tight seating engagement with the inner seating surface about the open wall portion, and said sleeve extending outwardly beyond the open end of the cup-shaped body and having an outwardly-directed flange to grip a delivery hose.

5. A gated valve to be inserted into operative engagement with wall edges of an open wall portion of a fluid-carrying housing member including a cup-shaped body of resilient material having an extending side wall closed off at one end and open at the other, said closed-off end being inwardly-placed with respect to the wall edges, said side wall having a plurality of spaced open portions to admit fluid from the housing member therethrough and an annular groove portion formed in a wall of said body adjacent said closed-off end, a flexible sealing rim about said body between the side wall open portions and the open end thereof for insertion past the wall edges into the housing member to seat against an inner surface of the open wall portion, a sleeve of resilient material carried for relative rotation by the cup-shaped body and having a plurality of spaced open portions aligned transversely of said body with the side wall open portions, whereby the open portions may be rotated into and out of registry, an annular flange portion on the sleeve to engage said groove portion and enable relative rotation between said body and said sleeve while maintaining said body and said sleeve in stationary axial alignment, said sleeve having cross ribs which extend radially across the inside of said sleeve to connect portions between the sleeve open portions and thereby reinforce the sleeve.

6. A spouted gate valve to be distorted into an operatively-mounted engagement with wall edges of an open wall portion of a fluid-carrying housing member including a resilient tubular body having a longitudinally-extending side wall, a closed-off inner end, an open outer end, said side wall having at least one passageway adjacent the closed-off inner end to admit fluid from the housing member into the tubular body and an internal circumferential groove portion extending around the side wall between the passageway and the closed-off inner end, spaced-apart resilient sealing rims on said body between the passageway and the open outer end to engage between inner and outer seating surfaces about the open wall portion and seal-off fluid flow between said open wall portion and the tubular body, a sleeve forming a relatively snug fit within the tubular body having a passageway alignable transversely of said body with the first-mentioned passageway, an external circumferential flange extending around the sleeve to make a snap-fit with the groove portion and enable relative rotation between said body and said sleeve while maintaining said body and said sleeve in stationary axial alignment, whereby the passageways may be rotated into and out of registry, and said sleeve extending outwardly beyond the open outer end of said body to act also as a spout.

(References on following page)

References Cited in the file of this patent

UNITED STATES PATENTS

| | | |
|---|---|---|
| 225,298 | Newton | Mar. 9, 1880 |
| 297,000 | Paulus | Apr. 15, 1884 |
| 812,627 | Wirth | Feb. 13, 1906 |
| 1,296,239 | Van Meter | Mar. 4, 1919 |
| 1,371,721 | Bayles | Mar. 15, 1921 |
| 2,513,272 | Bowen | July 4, 1950 |
| 2,693,203 | Hempel | Nov. 2, 1954 |
| 2,766,005 | Fischer | Oct. 9, 1956 |
| 2,771,904 | Sherman | Nov. 27, 1956 |
| 2,790,632 | Mellette | Apr. 30, 1957 |

FOREIGN PATENTS

| | | |
|---|---|---|
| 36,073 | Germany | of 1885 |